United States Patent
Gruenwald et al.

[11] Patent Number: 5,987,202
[45] Date of Patent: Nov. 16, 1999

[54] ARRANGEMENT FOR CONVERTING OPTICAL SIGNALS INTO ELECTRICAL SIGNALS AND METHOD OF PRODUCING THE ARRANGEMENT

[75] Inventors: Werner Gruenwald, Gerlingen; Gerhard Benz, Boeblingen; Klaus-Michael Mayer, Gerlingen; Annette Seibold, Rutesheim, all of Germany

[73] Assignee: Robert Bosch GmbH, Stuttgart, Germany

[21] Appl. No.: 08/875,263

[22] PCT Filed: Jan. 10, 1996

[86] PCT No.: PCT/DE96/00026

§ 371 Date: Jul. 18, 1997

§ 102(e) Date: Jul. 18, 1997

[87] PCT Pub. No.: WO96/22177

PCT Pub. Date: Jul. 25, 1996

[30] Foreign Application Priority Data

Jan. 18, 1995 [DE] Germany .......... 195 01 285
Dec. 21, 1995 [DE] Germany .......... 195 47 941

[51] Int. Cl.⁶ .......... G02B 6/30
[52] U.S. Cl. .......... 385/49; 385/88; 264/1.25
[58] Field of Search .......... 385/49, 88, 33; 264/1.25

[56] References Cited

U.S. PATENT DOCUMENTS 4,169,001  9/1979  Kaiser .......... 156/89
4,445,274  5/1984  Suzuki et al. .......... 29/832
4,546,065  10/1985  Amendola et al. .......... 430/313
5,475,775  12/1995  Kragl et al. .......... 385/14
5,701,374  12/1997  Makiuchi .......... 385/49
5,764,832  6/1998  Tabuchi .......... 385/49
5,771,322  6/1998  Matsumoto et al. .......... 385/31
5,786,925  7/1998  Goossen et al. .......... 359/245

FOREIGN PATENT DOCUMENTS 0 611 975 A1  8/1994  European Pat. Off. .
3543558 A1   6/1987  Germany .
41 06 721 A1 9/1992  Germany .
2 162 335    1/1986  United Kingdom .
WO 93/21550  10/1993 WIPO .

Primary Examiner—Rodney Bovernick
Assistant Examiner—Juliana K. Kang
Attorney, Agent, or Firm—Venable; George H. Spencer; Norman N. Kunitz

[57] ABSTRACT

Proposed is a method for producing an arrangement for converting optical signals into electrical signals, the arrangement comprising a substrate having structures for guiding an optical fiber and for deflecting light transmitted by way of the optical fiber. The structures (11, 12, 13) on the substrate (10) are created through the production of a mold of the contour of a molding tool. A ceramic base material is advisably used as the starting material for the substrate (10). The molding is effected through pressing, injection pressing, slip casting, injection molding or reaction casting.

20 Claims, 5 Drawing Sheets

ARRANGEMENT FOR CONVERTING OPTICAL SIGNALS INTO ELECTRICAL SIGNALS AND METHOD OF PRODUCING THE ARRANGEMENT

RELATED ART

The invention is based on a method of producing an arrangement for converting optical signals into electrical signals which is of the type having a substrate with structures for guiding an optical fiber and for deflecting light transmitted by the optical fiber, and wherein the structures are created on the substrate through the production of a mold of the contour of a molding tool, and to an arrangement of the generic type produced according to the method. A known, generic arrangement (DE-PS 41 06 721) is based on a silicon carrier. On one surface, the carrier has a plurality of V-trenches produced through anisotropic etching; these trenches terminate in angled, metallized end faces. The V-trenches serve to fix optical fibers, and the metallized end faces serve to deflect light transmitted via the optical fibers in a direction perpendicular to the optical axis of the optical fiber. A second carrier of light-permeable material is disposed on the silicon carrier, with converter elements being disposed on the second carrier for converting optical signals into electrical signals. The light-permeable second carrier supplies the light deflected at the metallized end faces of the V-trenches to the converter elements. V-trenches etched into a silicon substrate, as used in this known arrangement, represent superior fiber-guide structures. Corresponding to the silicon-crystal structure, the end faces at the ends of the V-trenches, which are inclined at 54 degrees, are suitable for use as deflection mirrors. Unfortunately, etching such a substrate is a costly production process because it must be performed in individual steps. As dictated by technology, the high frequency of the signals present at the output of the converter device require that the conductor paths leading away from the converter device be configured as electrical microstrips. These always require sufficient electrical insulation, for example in the form of a dielectrical layer, such as polyamide or glass, between the converter device having conductor paths and the silicon carrier. For technical reasons, it is also desirable to supply the signals produced by the converter device to a signal pre-processing along the shortest possible signal path. The pre-processing should therefore be positioned on the same substrate as closely as possible to the converter device. A configuration of the substrate that satisfies these technical requirements is associated with a comparatively large space requirement for each individual arrangement, and thus a reduction in the possible integration density of the mechanical guide structures on the substrates. Only a relatively small number of individual arrangements can be produced from one silicon wafer, resulting in correspondingly increased production costs.

DE-PS 43 00 652 proposes producing an integrated optical circuit by embedding an electro-optical semiconductor component on a molding tool. Plastics, particularly polymers, are listed as being suitable embedding materials.

This method does not provide a separation of substrate production and micro-assembly. Therefore, no controlled configuration of electrical and optical function structures on the substrate surface is possible.

DE-OS 42 12 208 further proposes molding master structures in plastics to permit cost-effective mass production of polymer components having self-adjusting coupling of fiber-guide structures to optical waveguide components. This method does not provide measures for configuring electrical structures.

The proposal to produce guide trenches for glass fibers in optical waveguide elements through injection-molding in plastic with the use of a molded part can further be inferred from DE-OS 43 17 953. This publication gives no indication of how to prepare the molded parts produced with this method for a subsequent assembly of electrical components. It also does not suggest alternative materials considered for the optical waveguide elements.

It is the object of the invention to provide a method for economical production of a generic arrangement and an arrangement that can be produced in accordance with the method.

SUMMARY OF THE INVENTION

The above object generally is achieved according to a first aspect of the invention by a method of producing an arrangement for converting optical signals into electrical signals, with the arrangement having a substrate with structures for guiding an optical fiber and for deflecting light transmitted by the optical fiber, and wherein the structures are created on the substrate through the production of a mold of the contour of a molding tool, a ceramic base material is used for the substrate, and the molding is effected through pressing or casting of the ceramic base material.

The above object generally is achieved according to a further aspect of the invention by an arrangement for converting optical signals into electrical signals, having a substrate into whose top side structures for guiding an optical fiber are formed, and further having means for deflecting light transmitted an optical fiber onto a converter device disposed on the substrate for the purpose of converting optical signals into electrical signals, and wherein the substrate comprises an electrically-insulating, ceramic base material, and the light-deflecting means are likewise formed into the top side of the substrate.

The proposed production method is based on the MIGA (Mikrostrukturierung Galvanoformung-Abforming [microstructuring electroform molding]) technique, which is known per se. In accordance with the invention, this technique is also used to produce substrates for electro-optical arrangements comprising a ceramic base material. Electronic components, conductor paths and contact-securing elements can be attached directly to such ceramic substrates. A particular advantage of ceramic structures lies in their known good high-frequency properties and simultaneous good thermal conductivity. Thus, the entire high-frequency electronics required for signal conversion can be assembled on a ceramic substrate to operate at typical transmission rates of 11 Gigabits per second. In this way, complete transmitting/receiving functional blocks having an edge length of a few centimeters can easily be structured.

This permits a cost-effective mass production of optical high-frequency transmitting and receiving modules. Costly mirror forms, such as focussing parabolic mirrors or similar beam-shaping elements, can advantageously be produced cost-effectively with the molding technique. The mirror metallization and the electrode production can advantageously be effected in the same work step.

The molding is usefully effected with a pressing method. If the structures attached to the surface of the ceramic substrate are intended to have especially smooth surfaces, the pressing is advantageously performed in two stages. The microstructure is filled with a glass-sintering material prior to the second pressing step.

Further advantageous modifications and practical embodiments of the proposed method and arrangement ensue from the features of the dependent claims.

An advantageous variation for producing particularly smooth mirror surfaces provides applying a glass-sintering paste locally to the surface provided for the mirror prior to pressing.

A further advantageous measure for producing mirrors having particularly smooth surfaces, and for producing mirrors having an arbitrary geometry, lies in providing a cavern at the end of the V-trenches in the master structure used in production. The desired mirror contour is attained with the aid of contour material. The cavern advantageously facilitates a selective coating of the mirror surface following pressing, for example with plastics or varnishes.

In addition to the pressing, the production of the ceramic substrate can be effected equally advantageously with a molding technique, slip casting, an injection-molding technique or an injection-pressing technique.

An advantageous option for avoiding the shrinkage occurring during sintering provides applying pressure to the ceramic mold to be sintered with the aid of a pressing tool placed on the pressed film during sintering. The molding tool used to press the ceramic substrate can easily be used as a pressing tool.

To reduce production costs further, it is useful to provide multiples of the molding tools through the creation of generations.

An arrangement of the invention and a production method of the invention are described in detail below with reference to the drawings.

DETAILED DESCRIPTION OF THE PREFERRED EMBODIMENTS

Figure 1A:
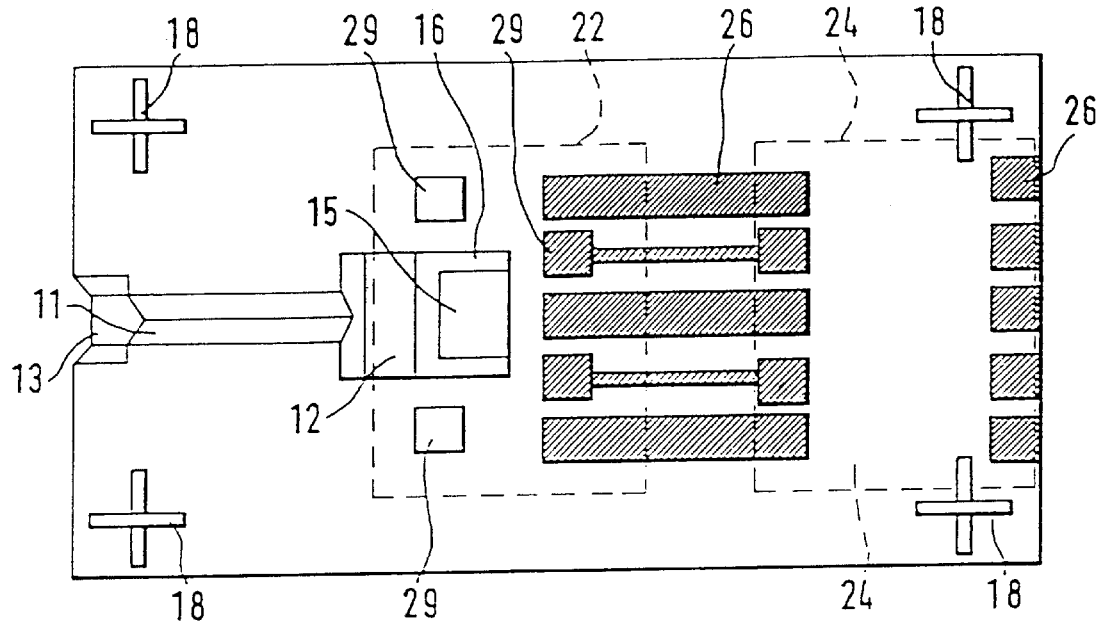
FIGS. 1a and 1b show a plan view and longitudinal section, respectively of a proposed signal-conversion arrangement.
Figure 1B:
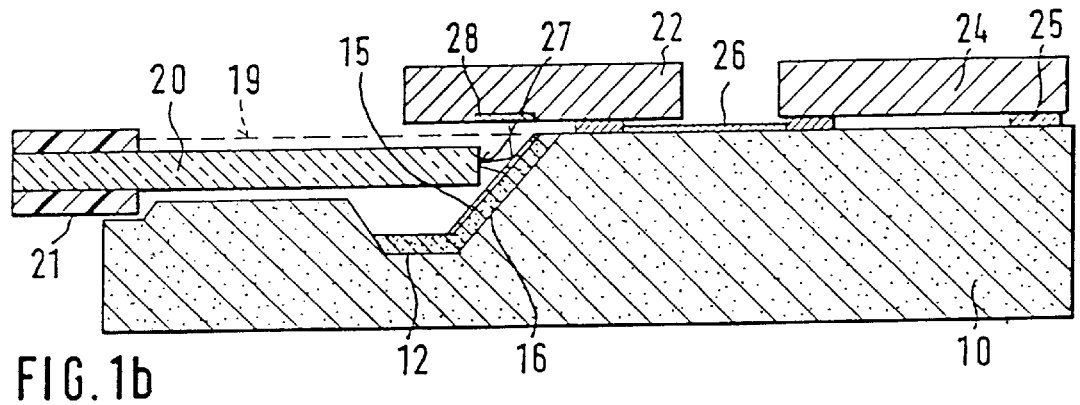

FIG. 1 shows a converter arrangement for converting optical signals into electrical signals. The basis of the arrangement is a ceramic substrate 10. On the substrate top side it has a microstructure 11, 12, 13 for fixing an optical fiber 20; the microstructure extends from the left side edge in FIGS. 1a and 1b to approximately the center. The microstructure is a combination of a brace 13 for fixing the support jacket 21 surrounding an optical fiber 20, a V-trench for guiding an optical fiber 20 and a trough-shaped cavern 16 in the region of the exit opening 27 of the optical fiber 20. The side wall of the cavern 12, which wall is opposite the exit opening 27 and, as stipulated by the silicon-crystal structure, ascends diagonally with respect to the optical axis of the optical fiber 20, and, as dictated by manufacturing technology, a part of the floor of the cavern 12 are coated with a contour material 16, for example a glass paste having a particularly smooth surface. A light-deflecting element 15, in mirror form in the embodiment, is disposed on its surface insofar as it lies opposite the exit opening 27 or in the beam path of light transmitted by way of the optical fiber 20. At the mirror 15, the light transmitted by way of the optical fiber 20 is reflected in a direction that is inclined with respect to the optical axis of the optical fiber 20. The reflection preferably occurs at a 90-degree angle; the mirror 15 has a 20- to 45-degree inclination with respect to the optical axis of the optical fiber 20. A receiving or transmitting device 22 and an HF (high-frequency) pre-amplifier device 24 are disposed on the top side 19 of the ceramic substrate 10. The two elements 22, 24 are preferably configured as chips. They are connected to the ceramic substrate 10 by way of contact surfaces 29, which simultaneously serve as fixing means. The transmitter/receiver chip 22 and the HF pre-amplifier 24 are connected to one another by conductor paths 26 that are likewise disposed on the surface 19 of the ceramic substrate 10, and all or some of them are configured as microstrips. Further microstrips 26' connected directly to the ceramic substrate 10 in the same way serve to fix the entire converter arrangement into the surrounding electronics. On its underside, that is, the side facing the substrate surface 19, the transmitter/receiver chip 22 has a detection window 28. It is located exactly above the beam spot generated by the light transmitted by way of the optical fiber 20 and reflected at the mirror 15. In the case of a receiver device, the detection window 28 is typically a photodiode that receives light transmitted by way of the optical fiber 20. In the case of a transmitter device, the window 28 is, for example, a surface-emitting laser diode that feeds light into the optical fiber 20 by way of the mirror 15. In addition to the operation-relevant structures, adjustment marks 18 are provided on the surface 19 of the ceramic substrate 10. They serve to facilitate the adjustment of the mask during metallization, as well as the orientation of the electronic components 22, 24 relative to the guide 11 of the optical fiber 20. A significant advantage of the arrangement shown in FIG. 1 is its use of a ceramic substrate 10. With it, an additional insulation of the conductor paths 26 and contact surfaces 25 for the surface 19 can be omitted. This again permits the combination of the steps of mirror production and metallization of the conductor paths or contact surfaces 25.

Figure 2A:
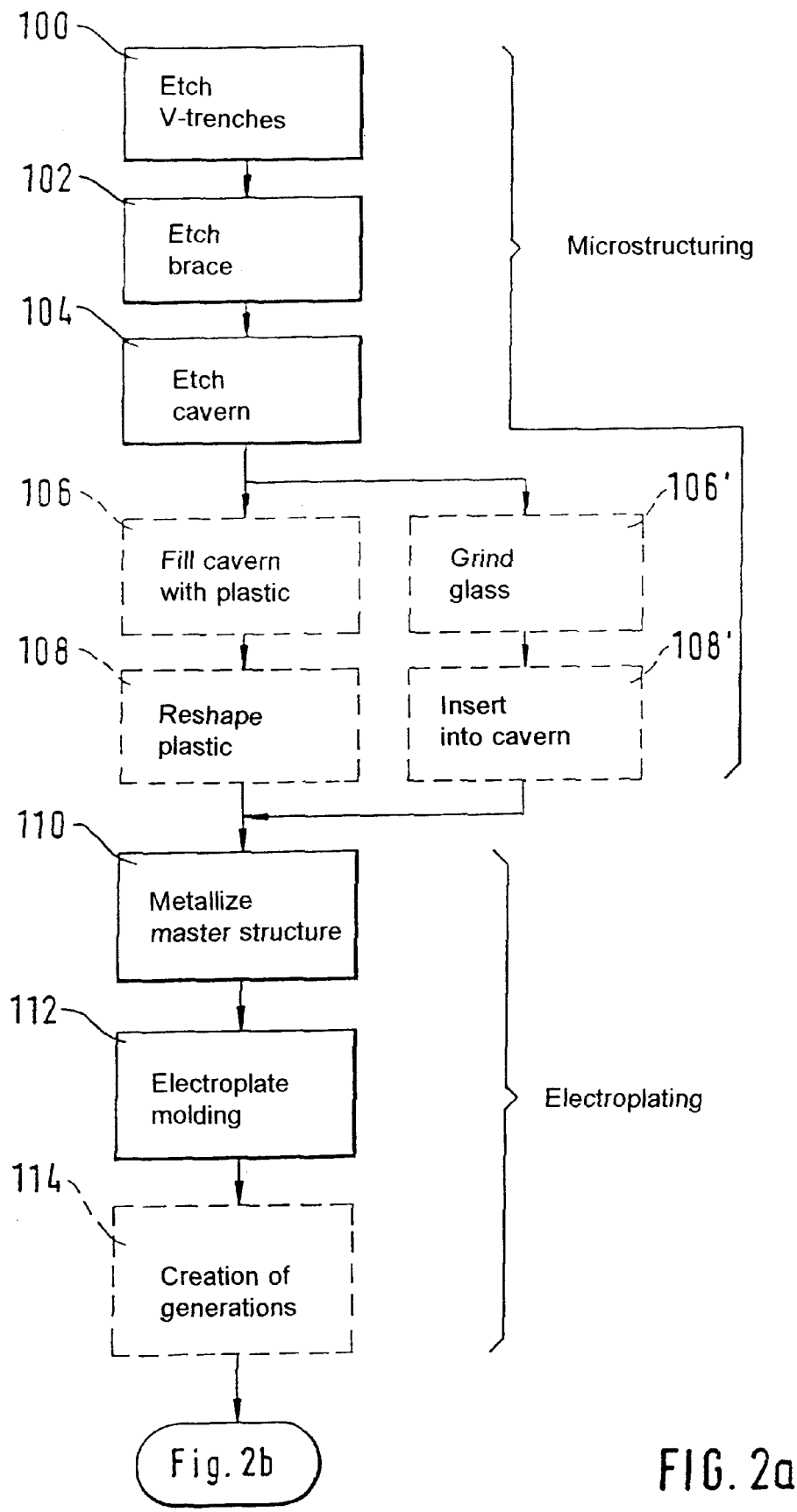
FIGS. 2a and 2b show a flow diagram of the proposed production method.
Figure 2B:
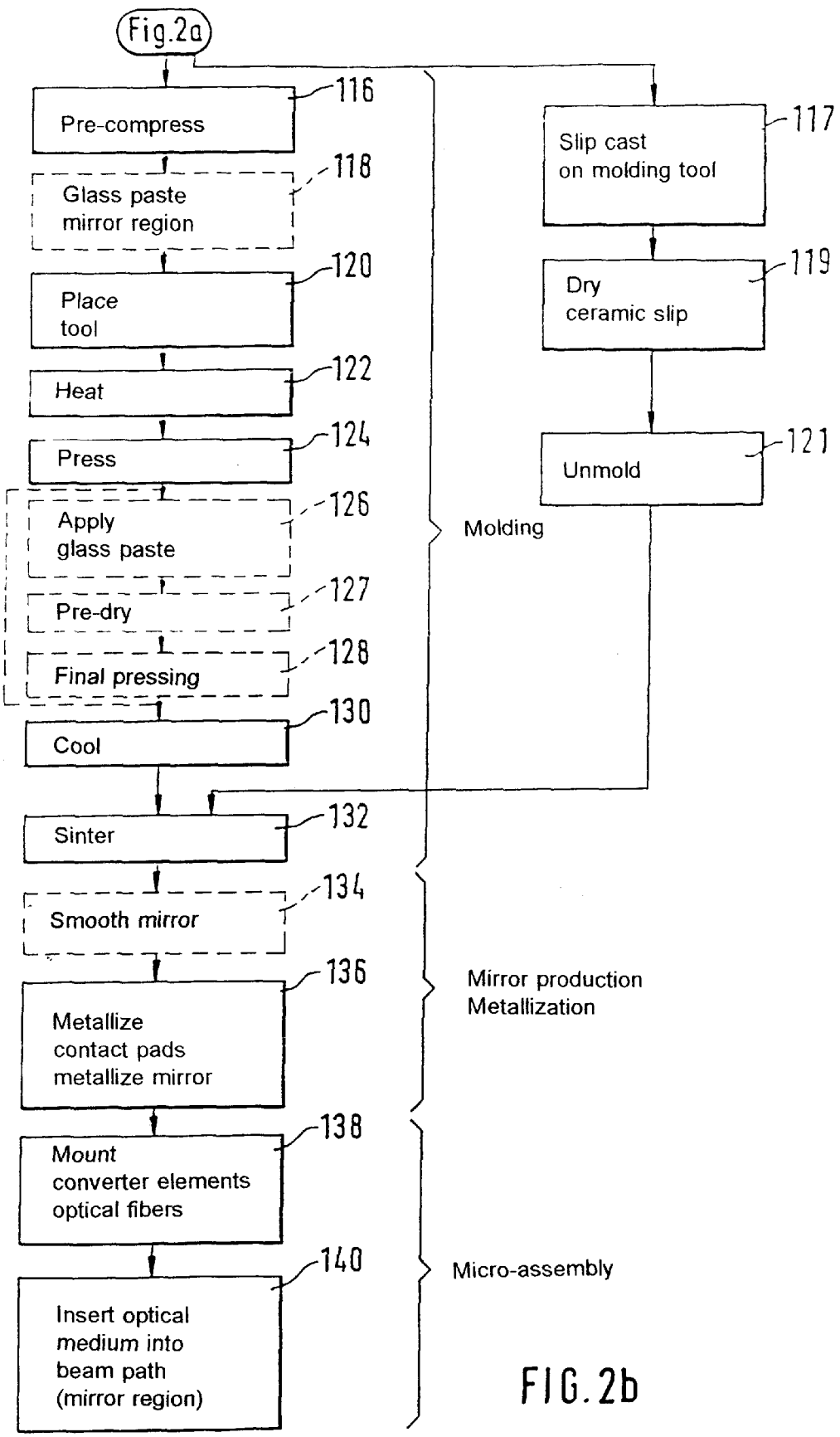

The flow diagram in FIG. 2 illustrates the course of a method suitable for producing an arrangement according to FIGS. 1a and 1b. The method is divided into the partial processes of microstructuring, electroforming, molding, mirror production and metallization, as well as micro-assembly.

Figure 3:
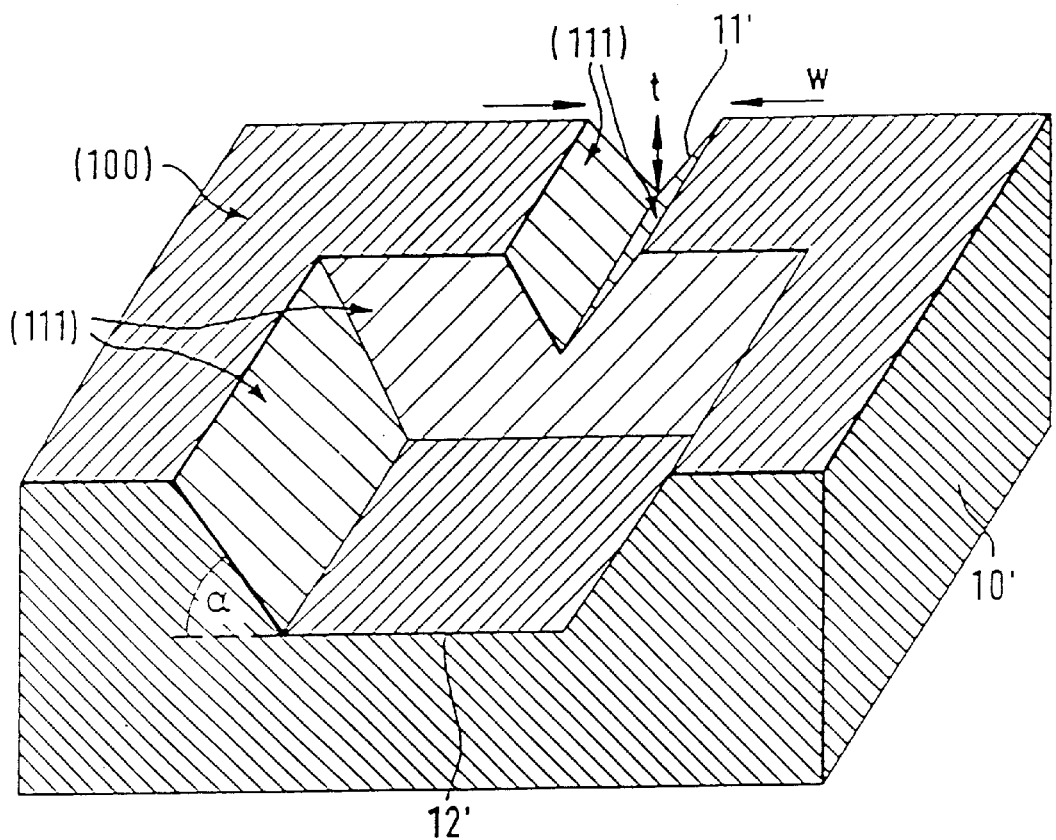
FIG. 3 shows a detail of a molding tool.

The first partial method process serves in the production of a master structure for molding. This is advisably effected with known micro-techniques, for example silicon micromechanics. In a first step 100, V-trenches 11' that will later function as guide structures for the optical fibers 20 are etched into a silicon wafer in a known manner, preferably by means of an anisotropic etching process in a hot KOH solution. Because the walls of the V-trenches have a 54.7-degree inclination along the entire (111-) crystal surfaces, the trench depth can be determined simply by the width of the openings of the lithography mask. The experimental precision is approximately 1 $\mu$m. For example, a depth t=170.8 $\mu$m results for a V-trench opening width w=241.6 $\mu$m. A single-mode standard glass fiber disposed in the trench and ending flush with the top surface in the trench would have to have a radius D=125 $\mu$m. In a subsequent step 102, a depression 13 serving as a brace is etched into the silicon wafer 10', at the entrance side of the V-trench. Its dimensions are a function of the diameter of the protective jacket 21 surrounding the optical fiber 20. In step 104 a trough-shaped cavern 12' is etched at the end of the V-trench located inside the silicon wafer 10'. Its walls also extend along the (111-) crystal surfaces of the silicon, and are inclined at a 54.7-degree angle with respect to the top surface of the substrate 10. With the exception of the wall including the V-trench 11', however, they are spatially separated from the open end of the V-trench 11' corresponding to the selected dimensions of the cavern 12'. This particularly facilitates the metallization of a mirror 15 on the cavern wall opposite the open end of the V-trench 11' at a later time without contamination of the side walls of the V-trench 11'. To clarify the course of the method, FIG. 3 shows a detail of a master structure having a V-trench 11' and a cavern 12'. In a simplified manner, the structures for the brace, fiber guide and mirror are defined and etched together in a single mask process.

If, for design reasons, an angle of inclination other than the 54.7-degree angle defined by the (111-) crystal surfaces of the silicon is desired for the mirror 15, a specially-cut silicon wafer can be used whose surface is inclined in the direction of the fiber-guide trench 11' with respect to the (111-) surface. The mirror inclination deviates by the desired value of 54°. As an alternative, the etching of the cavern 12' in step 104 can be followed by corresponding steps for producing the desired mirror inclination. A practical option for producing a desired inclination of the mirror 15 of, for example, 45 degrees, provides first filling the cavern 12' in step 106 with a contour material 16, simply a plastic, that is subsequently reshaped in step 108 through impressing with a cutter that has been ground at the desired angle. Residual plastic that may enter the V-trench 11' can be selectively removed, for example with laser ablation. Another, also practical option for producing a mirror 15 having a desired mirror surface involves grinding the desired mirror contour into, for example, a Pyrex glass body and inserting it into the cavern 12' in step 108'. The glass body is advisably fixed through direct bonding to the silicon. In an advantageous embodiment, a spherical glass lens is partially pressed into the plastic and subsequently removed to define a focussing hollow mirror. While this method of mirror preparation, which employs hybrid assembly, is associated with a high expense, it is a one-time expense. The later duplication in the molding process compensates for the expense.

The prepared silicon master structure is metallized in step 110, and a metallic molding tool is subsequently produced through electroplate molding in a manner known per se. Making further copies of the metallic molding tools as needed represents an advantageous variation with respect to production costs, particularly for mass production. This can be effected through the passivation of the electroplate surface and subsequent layering of electroplate on electroplate. From the first mold insert, the so-called mother, an intermediate copy is created as the first generation; a molding tool of the second generation is formed from this through repeated molding. Because numerous intermediate copies can be formed from one mother and numerous second-generation mold inserts can be unmolded cost-effectively from each intermediate copy, the molding tools can easily be duplicated at low cost.

In the next partial process, molding, ceramic substrates 10' forming the basis of the arrangement of FIGS. 1*a* and 1*b* are produced with the aid of the molding tools. Cast ceramic green tapes in film form are considered as starting material. They comprise compounds of particularly fine-grain ceramic powder with organic binding agents, and typically have a thickness in a range of 100 to 800 $\mu$m. The ceramic films are advisably pre-compressed through pressing in a first step 116 of the molding partial process. This measure improves the structural integrity in the later sintering process. To assure a sufficiently smooth surface of the later mirror 15, in step 118 a glass-sintering glass paste can be printed locally on the surface provided for the mirror 15, that is, the side wall of the cavern 12' located opposite the exit of the V-trench 11. In step 120 the molding tool is placed onto the film prepared in step 116 or 118. The film and, optionally, the molding tool, is or are now heated in step 122, and the molding tool is subsequently pressed into the film in step 124. The film is then cooled at constant dwell pressure in step 130 and unmolded. The pressed films are compressed in a subsequent sintering process in step 132.

As an alternative to pressing ceramic green tapes according to steps 116 through 130, the molding can advantageously be effected through casting (slip casting) of liquid ceramic slip on a molding tool in step 117. The ceramic slip is subsequently dried in step 119, unmolded from the molding tool in step 121 and re-sintered in step 132. The slip-casting method is distinguished by a very uniform material compression. As a result, non-uniform shrinkage during the following sintering process can be extensively prevented.

Figure 4:
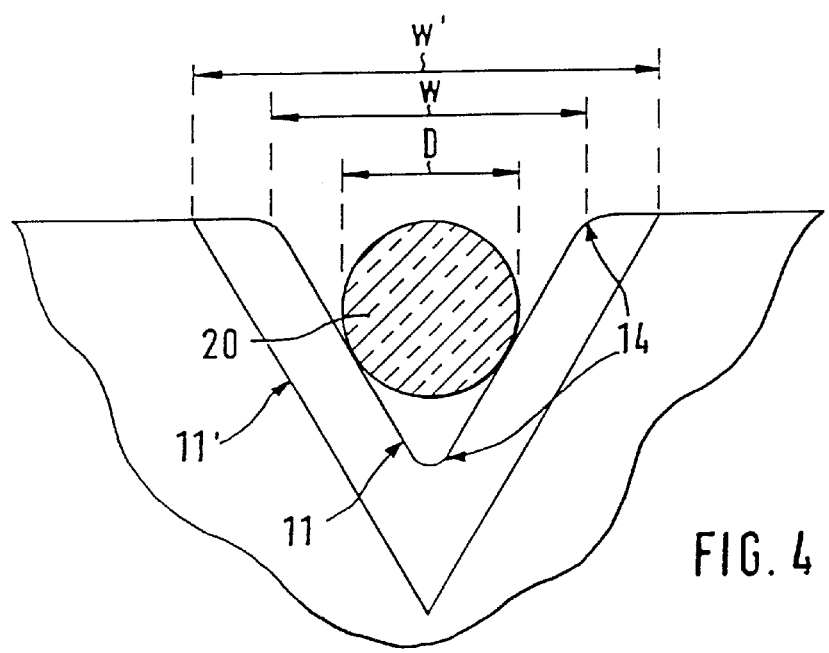
FIG. 4 shows a cross-section through a pressed V-trench, prior to and following sintering.

Depending on the compound, an isotropic shrinkage of typically about 20% occurs during sintering. However, reproducibility of the created structures with a precision of <1% of the shrinkage is possible through careful control of the sintering process in step 132, that is, particularly through precise monitoring of the temperatures and the sintering time and suitable matching of pressing parameters, powder structure and sintering parameters. Thus, the shrinkage can already be effected in the production of the master structures in the first partial process. If, for example, a nominal dimension of w=241.6 $\mu$m is predetermined after sintering for the width of the V-trench 11, the established opening width of the V-trench 11' must have the value w'=302 $\mu$m prior to sintering to allow for a 20% linear shrinkage. FIG. 4 shows the influence of the shrinkage during sintering using the shrinkage of a V-trench as an example. The sintering process, step 132, also easily leads to roundings of corners and edges, as indicated in FIG. 4. However, because only the side walls determine the extent of the adjustments with respect to the V-trenches 11, while the trough peaks of the V-structure and the upper edges do not, the problems entailed with the roundings can be effectively counteracted with a suitable microstructure design. This also applies particularly for the mirror surfaces, because only the inclined surface, and not the bordering edges, is essential for the function of the mirror 15 as a deflecting element.

Figure 5:
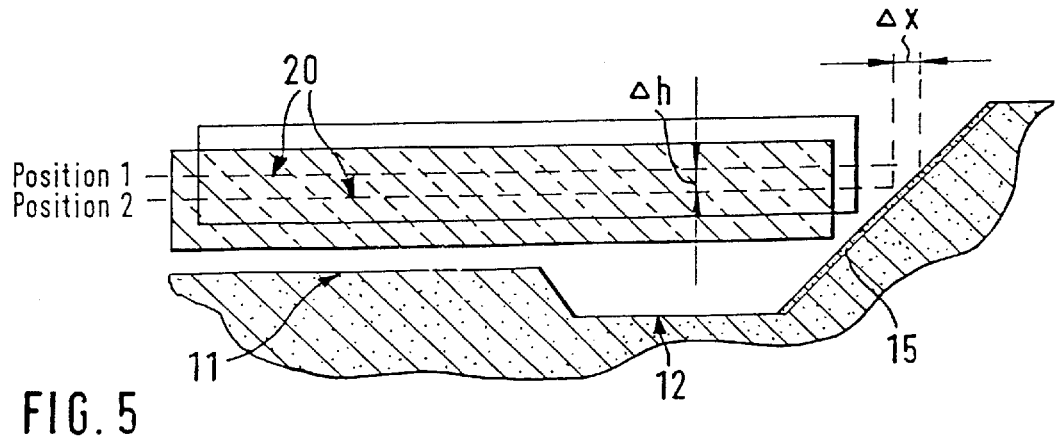
FIG. 5 shows a longitudinal section through a pressed microstructure having an optical fiber for depicting the effects of shrinkage during sintering.

As shown in FIG. 5, an essential consequence of shrinkage is a displacement of the height of the optical axis of the optical fiber 20 by an amount $\Delta$h. The effects of shrinkage can be easily kept in check if, as assumed in FIG. 5, a mirror 15 is used that is inclined at a 45-degree angle with respect to the optical axis of the optical fiber. This mirror always reflects light transmitted by way of the optical fiber 20 perpendicularly upwardly. Due to shrinkage, the beam spot formed by the light moves by an amount $\Delta$x in the direction of the optical axis of the optical fiber 20, which coincides with the height displacement $\Delta$h of the optical fiber 20.

Figure 6:
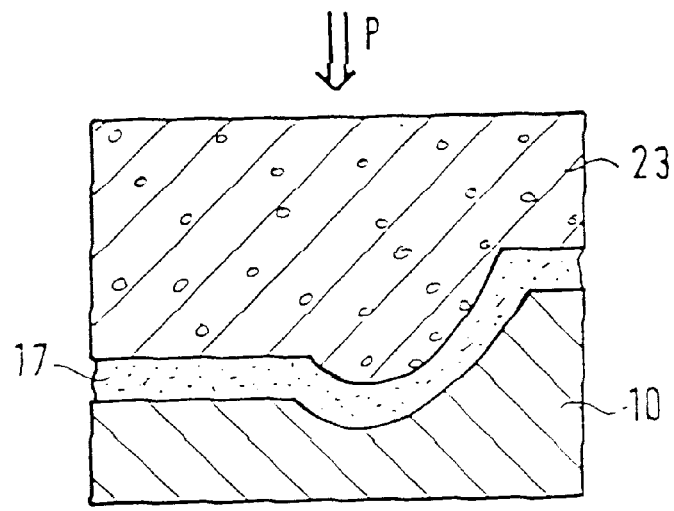
FIG. 6 illustrates the use of a pressing tool during sintering.

FIG. 6 illustrates an advantageous option of preventing shrinkage during sintering. Here a pressing tool 23 is applied to the pressed ceramic substrate 10 during sintering. This tool comprises a fireproof material, for example silicon nitride ($Si_3N_4$) or aluminum oxide ($Al_2O_3$), and is coated with a separating agent 17 on the support surface facing the ceramic substrate 10. The separating agent can also be applied to the ceramic substrate 10. The surface of the pressing tool 23 corresponds to an exact negative mold of the pressed surface of the ceramic substrate 10. During sintering, a pressure P is exerted on the ceramic substrate 10 with the aid of the pressing tool 23. With sufficient pressure P, shrinkage of the ceramic substrate 10 can be virtually prevented altogether, and the structures produced during pressing retain their intended dimensions.

The pressing tool 23 is advisably slightly porous so that the waste gases formed during the sintering process can escape through the pressing tool 23. A separating agent 17 is usually necessary for re-separating the pressing tool 23 and the ceramic substrate 10 from one another after sintering. Moreover, a single tool can be provided as both a molding tool for performing step 117 or 124 and a pressing tool for use in the above-described manner. This is particularly useful if the molding is effected with ceramic slip cast according to steps 117 through 121. In this instance, the molding tool can already be coated with a separating agent 17, so that an unmolding in step 121 prior to sintering in step 132 can be omitted.

To attain substrate structures 11, 12, 13 having especially smooth surfaces, which applies particularly for the surface provided for the mirror 15, a dual-stage pressing can also be provided instead of a single-stage pressing in step 124. In this case, the film is first pressed with reduced pressing pressure in step 124. The molding tool is subsequently raised, and the created structure is filled with a glass-sintering material, preferably a glass ceramic material, in step 126. If need be, the material is pre-dried in step 127. Afterward, the final molding is effected in a second pressing step, 128.

The mirror production/metallization follows the molding partial process. If the surface provided on the ceramic substrate 10 for the mirror 15 is not sufficiently smooth, the mirror 15 can be smoothed through the selective coating of the surface provided for the mirror 15 in step 134, for example through spray-coating with a polymer film such as photosensitive resist, polyamide or benzocyclobutene. This type of polymer film smooths the coated surface directly, or, if need be, after a one-time melt-on. The mirror surface can be smoothed further through brightening electroplate reinforcement of the metallization. Afterward, the electrical wiring, which typically includes high-frequency wiring in the form of microstrips in a coplanar arrangement, and the contact surfaces 29 (contact pads) for connecting the electrical components 22, 24 are attached to the completely-prepared ceramic substrate 10. The metallization of the mirror surface is advisably effected simultaneously, in a common masking step. In this instance, the mask is aligned with respect to the imprinted adjustment marks 18, with lateral shrinkage thus being automatically taken into consideration for the position of the electrodes.

The metallized ceramic substrate 10 is finally equipped with components in step 140. First, the transmitter/receiver chip 22 is placed onto the prepared contact surfaces 29 and connected (bonded) to the substrate in a flip-chip technique, i.e., with the contact pads and the detection window 28 at the bottom. Self-centering is possible in a manner known per se with the solder globules melting onto the contact pads 29. As an alternative, the transmitter/receiver chip can be actively adjusted with an optical positioning apparatus. A receiving diode can also be mounted, with the detection zone on top, above the mirror 15 if the wafer material is transparent to the light wavelength to be received. The pre-reinforcer tip 24 is attached in the same manner. Afterward, the optical fiber 20 is laid in the fiber-guiding V-trench 11, pushed beneath the chip 22 up to the mirror 15, and fixed.

The signal transmission typically takes place by way of the described converter arrangement at a transmission rate of 5 to 11 Gigabits/second. In the case of a high-frequency-capable receiver chip 22, the active surface of the diode 28 therefore must not exceed a diameter of about 50 $\mu$m in order to keep the diode capacities small. On the other hand, the widening of the beam of light exiting a (monomode) glass fiber is dictated by the exit aperture of the fiber. If the aperture is, for example, $N_A=0.2$ with a distance of approximately 130 $\mu$m between the exit opening 27 of the optical fiber and the diode 28, and with the use of a 45-degree mirror 15, a beam-spot diameter of approximately 30 $\mu$m results. It therefore lies within the active surface of the diode 28. All of the transmitted light is thus received reliably.

A further reduction in the beam spot on the diode is advisable for improving the receiving reliability further, and allow greater assembly tolerances. A smaller beam spot is achieved by filling the cavern 12 with a medium having a higher refractive index in step 140. For example, the beam spot can be reduced to about 20 $\mu$m by the application of an optical epoxy adhesive having a typical refractive index of n~1.5. In this way, a high-bit-rate receiving module is possible without further beam focussing.

It is also possible to reduce the beam spot and thus improve the transmission properties through beam focussing. To this end, the mirror 15 can be configured as, for example, a hollow mirror.

Figure 7:
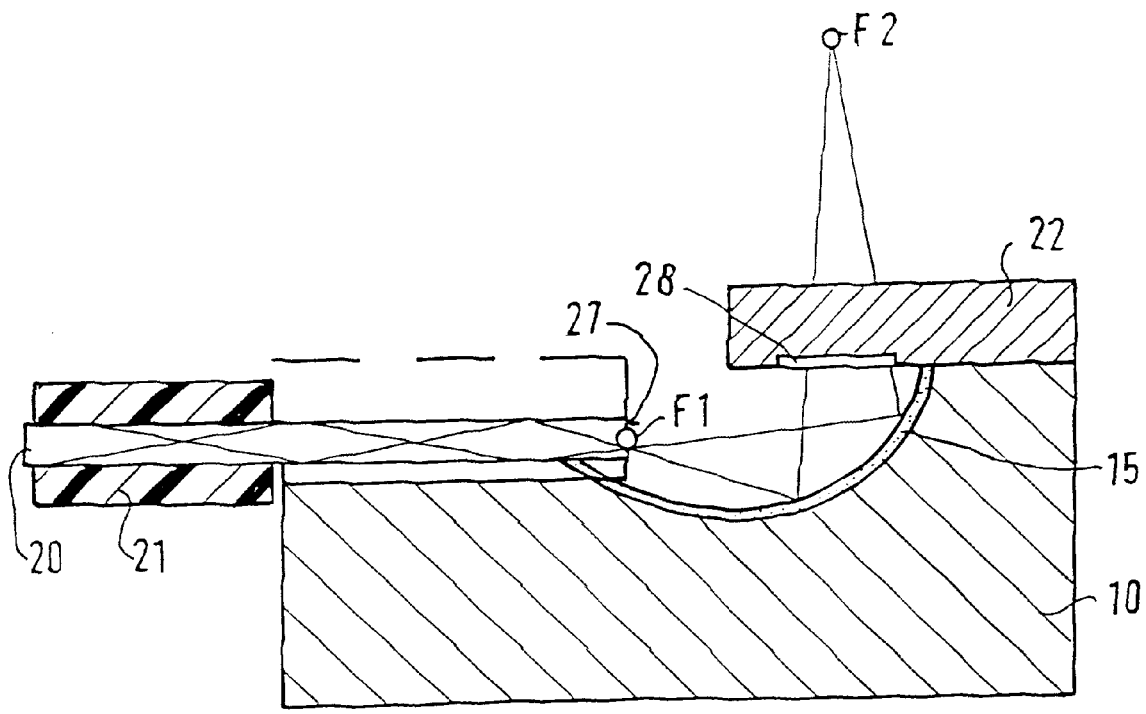
FIG. 7 shows a converter arrangement having an ellipsoid mirror.

FIG. 7 shows a converter arrangement having an ellipsoid mirror 15 as an example of a beam-focussing mirror configuration. It is arranged such that one focal point F1 lies in the center of the exit opening 27 of the optical fiber 20 and the other focal point F2 lies above the transmitter/receiver element 22. The light beam is consequently convergent toward the transmitter/receiver element 22, so the detection window 28 located at the element can be positioned much more easily. The mirror geometry shown in FIG. 7 can advantageously be attained with a slip-casting method, with the measure indicated in FIG. 6 being used during sintering in step 132, namely that a pressure is exerted on the mirror structure 15. The metal coating is advisably effected with a ball-printed platinum resinate paste that produces a platinum mirror during sintering under pressure.

Numerous embodiments of the above-described arrangement and method are possible that retain the underlying concepts. Hence, the production method is not limited to a ceramic pressing technique. Rather, it can be expanded analogously to other moldable materials, such as thermoplastic plastics, reaction casting resins, casting slip, sprayable ceramic compounds or organically-modified ceramics. The method is also not limited in principle to the production of electro-optical converter arrangements, but also permits, for example, the production of micro-optical banks. Most notably, holding elements for other micro-optical components, such as optical insulators, microlenses, filter wafers and the like are pressed in addition to fiber guides in the form of V-trenches in this case.

We claim:

1. In a method of producing an arrangement for converting optical signals into electrical signals, with the arrangement having a substrate with structures for guiding an optical fiber and for deflecting light transmitted by the optical fiber, wherein the structures (11, 12, 13) are created on the substrate (10) through the production of a mold of the contour of a molding tool, the improvement wherein: a ceramic base material is used for the substrate (10), and the molding is effected by providing a ceramic base material in the form of one of a ceramic slurry and a ceramic green compact, producing a substrate with the structures through pressing or casting of the ceramic base material using the molding tool; and subsequently sintering the formed ceramic substrate.

2. Method according to claim 1, wherein the molding is effected through casting of ceramic slip on the molding tool.

3. Method according to claim 1, wherein the molding is effected through injection-pressing, injection-molding or reaction casting.

4. Method according to claim 1, wherein a film based on a ceramic base material is used as the provided starting material for the substrate (10).

5. Method according to claim 4, wherein the film is a green tape comprising compounds of fine-grain ceramic powder with organic binding agents.

6. Method according to claim 4, wherein the production of the structures on a substrate film comprises the following steps:
   a) placement of a molding tool onto the film
   b) heating of the film
   c) pressing of the molding tool into the film
   d) cooling of the film.

7. Method according to claim 4, wherein the substrate film is pre-compressed sheet-wise prior to the pressing of the molding tool.

8. Method according to claim 1 wherein the substrate (10) is placed under pressure during sintering with the aid of a pressing tool (23).

9. Method according to claim 8, wherein a separating agent (17) is inserted between the pressing tool (23) and the substrate (10).

10. Method according to claim 8, wherein the pressing tool (23) comprises a porous material.

11. Method according to claim 8, wherein the molding tool used to produce the structures (11, 12, 13) on the substrate (10) is used as the pressing tool (23).

12. Method according to claim 1, wherein a glass-sintering glass paste is applied (126) to the substrate (10) prior to pressing.

13. Method according to claim 12, wherein the structure is pre-dried following the application of the glass-sintering material.

14. Method according to claim 1, wherein a first pressing step (124) is performed with reduced pressing pressure, a glass-sintering material is applied (126) to the microstructure obtained in the process, and a second pressing step (128) is subsequently performed for producing the final structure.

15. Method according to claim 1, further comprising attaching conductor paths (26) and contact surfaces (29) to the substrate (10), and metallizing the light-deflecting structure (15) in a common masking step (136).

16. Method according to claim 1, wherein the light-deflecting structure (15) is configured as a mirror, and the surface provided for the mirror is first smoothed, then metallized.

17. Method according to claim 1, wherein the light-deflecting structure (15) is configured as a mirror, and further comprising initially subjecting the surface provided for the mirror to a base metallization, and a subsequent reinforcing through an electroplate that brightens the surface or makes it level.

18. Method according to claim 1, further comprising filling the region (12) of the optical fiber-guide structure in which the exit opening (27) of an optical fiber (20) inserted into the guide structure (11, 12, 13) is inserted with a material whose refractive index is greater than 1.

19. In a method of producing an arrangement for converting optical signals into electrical signals, with the arrangement having a substrate with structures for guiding an optical fiber and for deflecting light transmitted by the optical fiber, and wherein the structures (11, 12, 13) are created on the substrate (10) through the production of a mold of the contour of a molding tool, the improvement wherein a ceramic base material is used for the substrate (10), the molding is effected through pressing or casting of the ceramic base material, and, a glass-sintering glass paste is applied (126) to the substrate (10) prior to pressing.

20. In a method of producing an arrangement for converting optical signals into electrical signals, with the arrangement having a substrate with structures for guiding an optical fiber and for deflecting light transmitted by the optical fiber, and wherein the structures (11, 12, 13) are created on the substrate (10) through the production of a mold of the contour of a molding tool, the improvement wherein a ceramic base material is used for the substrate (10), and the molding is effected through pressing of the ceramic base material in that a first pressing step (124) is performed with reduced pressing pressure, a glass-sintering material is applied (126) to the microstructure obtained in the process, and a second pressing step (128) is subsequently performed for producing the final structure.

* * * * *